(No Model.)  
3 Sheets—Sheet 1.

J. R. PARKER.
DREDGING APPARATUS.

No. 601,524.   Patented Mar. 29, 1898.

Witnesses,

Inventor,
John R. Parker
By Dewey & Co.
Attys (No Model.)  3 Sheets—Sheet 2.
J. R. PARKER.
DREDGING APPARATUS.
No. 601,524.  Patented Mar. 29, 1898.
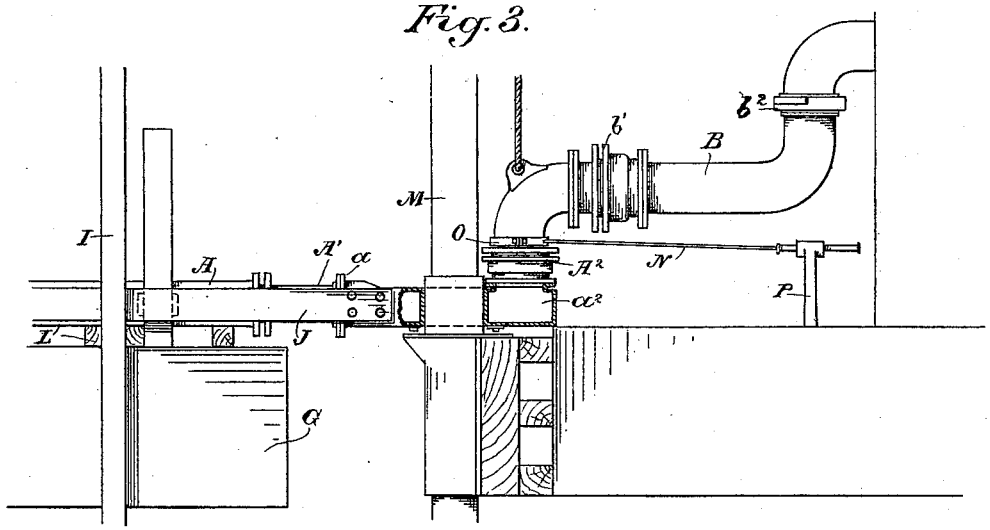
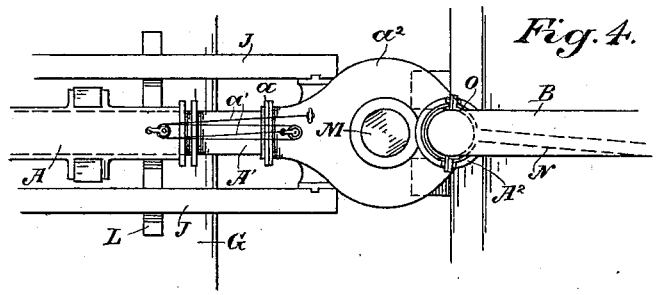
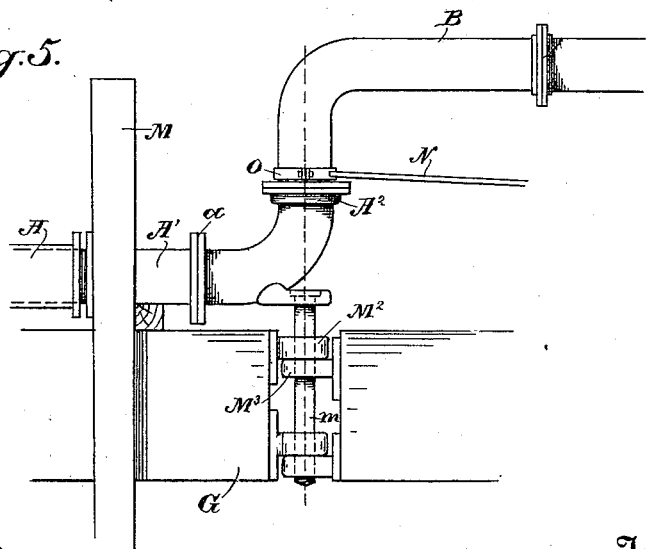
Witnesses,
Inventor,
John R. Parker
By Dewey & Co.
Attys (No Model.) 3 Sheets—Sheet 3.
J. R. PARKER.
DREDGING APPARATUS.
No. 601,524. Patented Mar. 29, 1898.
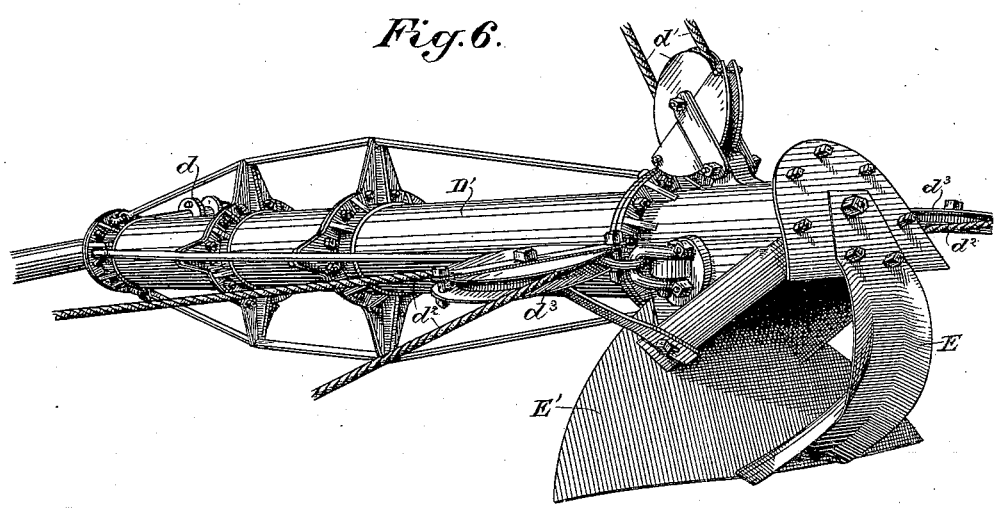
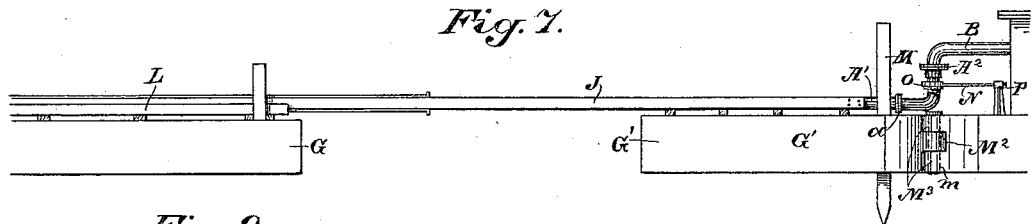
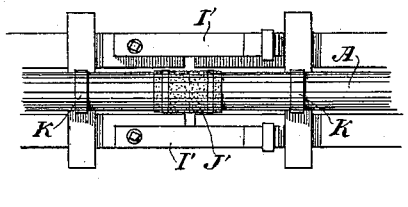
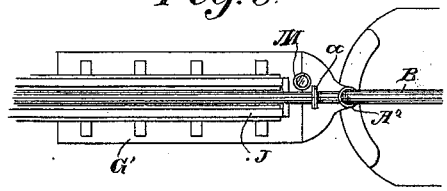
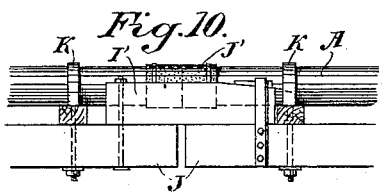
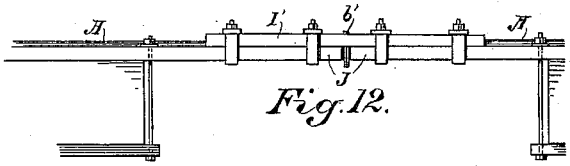
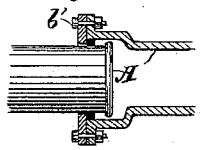
Witnesses,
Inventor,
John R. Parker
By Dewey & Co. Atty

UNITED STATES PATENT OFFICE.

JOHN R. PARKER, OF OAKLAND, CALIFORNIA, ASSIGNOR TO THE PACIFIC COAST DREDGING AND RECLAMATION COMPANY, OF SAN FRANCISCO, CALIFORNIA.

DREDGING APPARATUS.

SPECIFICATION forming part of Letters Patent No. 601,524, dated March 29, 1898.

Application filed September 16, 1897. Serial No. 651,955. (No model.)

*To all whom it may concern:*

Be it known that I, JOHN R. PARKER, a citizen of the United States, residing in Oakland, county of Alameda, State of California, have invented an Improvement in Dredging Apparatus; and I hereby declare the following to be a full, clear, and exact description of the same.

My invention relates to dredging apparatus, and more especially to that portion of the apparatus by which the material is transferred from the plows or diggers by which it is excavated to a distant point where the dredged material is to be deposited, and in a means for advancing the digging apparatus as fast as it is required for the purpose of excavating in fresh ground.

The invention will be more fully explained by reference to the accompanying drawings, in which—

Figure 1:
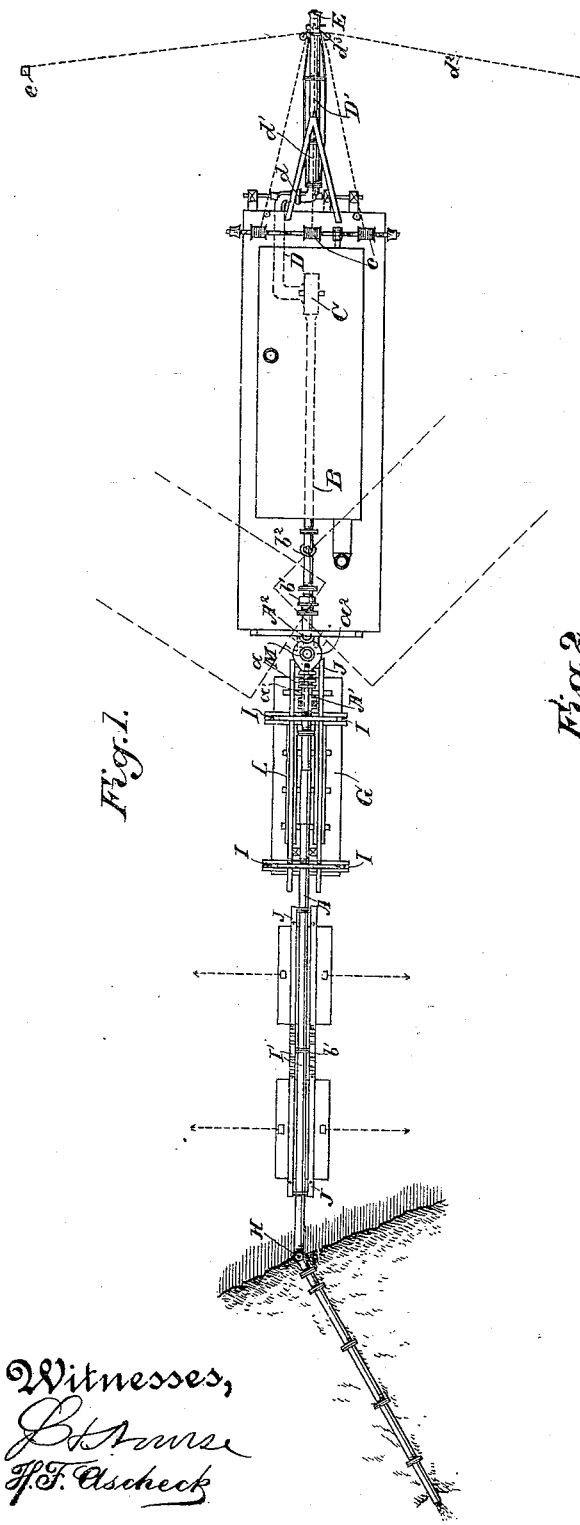
Figure 2:
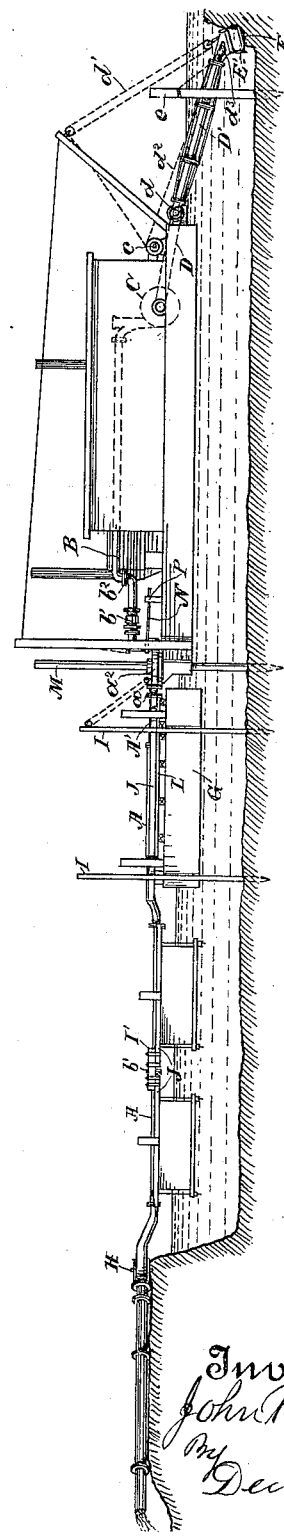

Figure 1 is a plan view of a portion of the apparatus, showing a telescopic extension of the rigid pipe. Fig. 2 is a side elevation of the same. Fig. 3 is an enlarged view of the hinge-joint between the two rigid sections of conveying-pipe A B. Fig. 4 is an enlarged view of the apparatus. Fig. 5 is a modification of the swivel pipe-joint and the hinge. Fig. 6 shows the excavator. Figs. 7 and 8 show an intermediate float to support the telescopic section, the movable float hinged thereto, and the swivel pipe-joint in line above the hinge. Figs. 9, 10, and 11 are enlarged views of the conveying-pipe joints. Fig. 12 is an enlarged view of the joint-supporting devices of Figs. 1 and 2.

The object of my invention is to provide a means for connecting the rigid conveying-pipe with the corresponding rigid connection between said pipe and the digging or excavating mechanism in such a manner that the latter may be advanced as fast as the necessities of the work require, without the employment of any flexible sections in the conveying-pipe, and in the formation of a swivel-joint between the two rigid pipe-sections which will allow that portion connecting with the digging apparatus to be swung in an arc of a circle with relation to said joint, so as to excavate to any desired width.

For the purpose of transferring excavated material a suction-pipe is fitted to some form of digging or excavating apparatus, so that the excavated material may be drawn into said pipe, in conjunction with a sufficient amount of water when necessary, so that it can be afterward transported to considerable distances through conveying-pipes and deposited at any desired point. This is effected by connecting any form of suction and forcing apparatus with the inlet and discharge pipes, so that the material is constantly drawn in through the suction-pipe and forced out through the delivery-pipe.

In some forms of dredging apparatus the discharge-pipe consists of a series of sections which are flexibly joined together and supported upon floats or pontoons, and the pipe is so curved as to be of a considerably-greater length than the distance between the dredging apparatus and the point of deposit, so as to enable the dredge to be advanced from time to time by gradually straightening out the curved sections to allow of this advance.

In my invention I employ rigid sections of discharge-pipe A, having suitably tight and essentially rigid joints whereby they are united together, the whole forming a discharge-pipe which may be supported upon the bottom of the stream, estuary, or other waterway if it is necessary to cross such waterway, or it may be supported upon the land if the digging is sufficiently near for the purpose, or if the digging takes place at a distance across a considerable body of water the pipe may be supported upon floats or pontoons so anchored in the line of direction of the pipe that the latter will be supported in as nearly a straight line as can be effected with such changes of direction as may be required made by the use of elbows, curved sections, or equivalent joints inserted at intervals between the pipe-lengths, and the pipe is thus held in as nearly a rigid line as the effect of the wind and waves upon its supports will allow. The essence of this construction is the fixing of the conveying-pipe without flexible joints as rigidly as possible and as nearly in straight lines from the point of the reception of the dredged material to the point of delivery as can be maintained, and the connection therewith of a telescopic section of any desired length, which is extensible in the line of the pipe, without flexibility, for the purpose of advancing the excavating apparatus from time to time. To the receiving end of this pipe is joined a second rigid section B, the joint $A^2$ being formed by any well-known swivel or rotary connection, about which joint the section B is turnable from side to side. This section B is connected with the discharge-passage of a suction and forcing apparatus, which in the present case is shown in the form of a rotary pump C. The inlet to this pump is connected by a rigid section or sections D D' with any suitable form of digging or excavating apparatus. In the present case I have shown a plow or cutter E, with colters or plates E', which is adapted to excavate the material when the cutter is moved across it, and the pipe-section D' is so connected with the excavating-plow and with the suction-pump that the material excavated will be drawn into the pipe as fast as the excavation takes place. This section of pipe is connected at the rear end with the pipe D by any suitable swivel-joint or trunnion $d$ which will allow it to turn about the joint without breaking the connection with the suction-pipe. Suspending-ropes $d'$ extend from the outer end over an elevated support, and this allows the plows or excavators to be raised or gradually depressed as the material is cut away. The length of the pipe-section connecting the excavator with the joint $d$ is sufficient to allow of as great a depression as is necessary to excavate to any desired depth.

The excavating device is moved from side to side, turning about the joint which connects the pipes A and B, so that it may swing in a part of a circle the radius of which is equal to the distance between the joint and the excavator, and the work may be as great as desired by the distance to which the excavator is swung to either side. In order to thus swing the excavating device, posts or other holding devices $e$ are fixed at a considerable distance away upon each side of the excavator, and by means of ropes or chains $d^2$, passing from side posts or other fixed points around pulleys $d^3$, connected with the suction-pipe or excavator, and thence to some suitable form of winding-drum $c$, supported in conjunction with the movable pipe-section, the excavator can be gradually moved to the end of its work in one direction. Then by reversing the winding apparatus it may be returned to the opposite end of the work.

The horizontal joint $d$ between the pipes D and D' allows the latter to sink, carrying with it the excavator as fast as the material is removed. When a sufficient depth has been reached, the excavator may be raised above the surface of the material and advanced a sufficient distance to make a new cut. The method of making this advance is by lengthening the rigid delivery-pipe A. This is effected as follows: The end of this pipe, being securely anchored and fixed, has a section A' of any desired length telescoping within it. This section passes through a suitable stuffing-box, as shown at $a$, and the joint $A^2$ is formed between the outer end of this telescoping section and the rear end of the pipe B. When the excavator is to be advanced, as previously described, it is only necessary to extend the rigid pipe A by moving the telescopic section A' forward a distance equal to that which it is desired to advance the excavator. The latter will then be in position to be again swung from side to side and make a new cut. The telescopic section may be moved out or in by means of block and tackle $a'$; but when at work the pressure from the pump is so great that it is only necessary to loosen the tackle and the interior pressure is sufficient to push the telescopic section and the whole excavating apparatus forward to any desired distance up to the length of the pipe. Each advance is thus made by simply moving the telescopic section forward until the whole length of this section has been advanced. The pipe is then extended and the apparatus set for a new advance by retracting the telescopic portion into the pipe A and securing a new length or section at a suitable point in A.

It will be manifest that the joint $A^2$, about which the excavator is caused to swing, may be at any distance from the excavator to conform to the length of the radius of the arc in which it swings, the joint being formed in the pipe so that the forward portion connecting with the excavator may be made to swing upon this joint without advancing.

In using this apparatus it is sometimes convenient to cut a certain width by swinging the excavator, as previously described, and any desired length by the gradual advance, after which the excavator may be retracted and by an elbow or other joint somewhere in the main pipe the apparatus may be headed to advance in a new direction.

By another construction, (shown in Fig. 1,) and where it is desirable to cut the full width of the channel at once, the main conveying-pipe is provided with a joint H at some point in its length, and the section between this joint and the excavator, supported on floats or otherwise, may have its direction changed about this joint after each cut in any one direction has been completed. This construction allows the excavator to be advanced by its telescopic section and swung around its own joint to cut the full arc of its circle. It is then retracted and the whole apparatus turned about the joint H until it is headed in a new direction adjacent to the cut already made and a new cut is completed. The joint H simply takes the place of elbows of various angles to allow a change of direction, and it remains stationary while the excavation is going on. The advance in each case is made by means of the telescoping sections of pipe, by the extension of which the excavating apparatus is moved forward a distance equal to the width of each cut until the full length of said section is used, after which the telescopic section is retracted and another section of pipe is added to the main line, as before described, and the work carried on.

In order to support the stationary portion of the pipe, about which the excavating portion is turnable, it is fixed or anchored firmly in any suitable manner. In the present case I have shown the conveying-pipe with its telescoping section supported upon a float or floats G, having guides at suitable points, preferably near each end, and spuds I are driven down through these guides into the mud or bed of the body of water in which the float is situated, so that this float is maintained at all times as stationary as possible while the apparatus is at work.

The telescopic section A' of the pipe A is extended forward therefrom at intervals, as required. I have found that in order to steady and support this telescopic section when it has been extended to a considerable distance from the fixed float and to resist the action of the wind and waves sliding timbers J should be fixed with relation to the pipe, so as to form supports therefor. These timbers are made slidable in guides L, fixed upon the float G, so that as the pipe and its supporting-timbers are moved forward the guides steady the parts and hold them rigidly in line with the main pipe, of which it forms a part. The front end of the telescopic section A' may also be supported upon a float G' intermediate between float G and the one which carries the pipe B, this float G' being advanced in unison with the extension of the pipe-section A'. When the pipe has been extended to a considerable distance, the addition of a vertical spud or anchor passing through its front end, or through the float G' on guides thereon, assists to retain it in position and prevent its being moved out of line by the action of the wind, waves, or current. In one form of construction, Fig. 1, I have shown such a spud at M, and the pipe is split or divided into two branches, one passing each side of the spud and practically forming a casing $a^2$, through which the spud passes. The forward and movable section of the pipe B is then connected with the pipe where the two parts again come together and has the swivel-joint $A^2$, as previously described. As this joint is slightly out of line with the spud center, it is moved in a small arc of a circle by the swinging of the forward end B of the pipe. In order to assist it in this movement, I have shown a bar N, to the end of which is fixed a clamp O, which clasps the vertical portion of the joint-section of the pipe B, as shown. A telescopic or slip joint $b'$ is formed in the section B and a second swivel-joint at $b^2$, or their equivalents, to compensate for the movement of the joint $A^2$ about the spud M. The rear end of the bar N is fitted to slide in a fixed guide P, which is located upon the float or support which carries the excavating device, engines, pump, and the portion B of the pipe. This float is also connected with the stationary hinge on the fixed pipe or its support, about which the parts are turnable, and the whole forward portion of the device is thus movable in unison.

In Fig. 5 I have shown the float G anchored by a spud or otherwise, as previously described, and having fixed to the front end one part of a strong hinge-joint $M^2$. The other part $M^3$ is fixed to the float which carries the engine and other machinery and the pipe-section B, and they may be connected or disconnected by a strong hinge-pin $m$. In this construction the swivel-joint $A^2$ is axially in line with the hinge-pin and no compensating device is necessary.

The spuds or anchors may be raised whenever movement is necessary by means of a derrick or frame situated upon the float which supports the telescopic pipe or otherwise, and, if desired, the float carrying the dredging mechanism can at any time be detached from the pivot or hinge of the stationary pipe and moved away from it, a joint in the pipe B being uncoupled at the same time.

As the main-conveying-pipe sections must be uncoupled to admit new sections as the work progresses and to remove sections when the apparatus is retracted for a new cut, I have shown a convenient means for rapidly doing this by abutting the pipe ends between rigid timber or other supports I', extending along the pipe across each joint.

J' is a flexible or other section adapted to inclose the joint to prevent leakage, and these sections are held firmly in place by clamps K.

Having thus described my invention, what I claim as new, and desire to secure by Letters Patent, is—

1. A dredger and telescopic section of discharge-pipe, the latter firmly anchored in position and rigidly joined to other sections of discharge-pipe extending to the place of deposit for dredged materials, and a joint connecting the telescopic section with the dredger to allow the dredger to move from side to side when at work, and to move ahead as the work progresses without disturbing said fixed sections of discharge-pipe.

2. In a dredging apparatus, a fixed conveying-pipe having the receiving end supported and anchored, a telescoping section slidable longitudinally in said fixed portion, an excavator with suction and discharge pipes, said pipes being hinged at the rearward end to the first-named anchored section.

3. In a dredge, a pipe-line composed of sections rigidly united together, a pipe-section slidable longitudinally with relation to the receiving end of the pipe-line, said section having a spud or pivot by which it is anchored, an excavating mechanism, suction-pump, connecting and discharge pipe, and a joint whereby said pipe is connected with the telescopic section so as to allow the excavator to swing from side to side with relation thereto.

4. In a dredge, a conveying-pipe consisting of essentially rigidly-united sections, means for fixing said pipe permanently in place, a telescopic section slidable with relation thereto so as to extend the length of the fixed pipe-line, a guide fixed with relation to the front end of said section, a spud-anchor adapted to fit said guide and maintain the slidable section in line with the main pipe, an excavating device with suction and discharge mechanism and pipes mounted upon a float, a hinge exterior to the float by which it is connected with the fixed pivot and a joint whereby the suction and discharge pipes are connected with the telescopic section.

5. In a dredging device, a conveying-pipe consisting of essentially rigidly-connected sections, and supports therefor, an anchored float or support upon which the receiving end of said pipe is supported, a telescopic section slidable longitudinally with relation to said fixed pipe and float, having a pivot or hinge joint at the outer end, a structure carrying the excavating device, suction and discharge mechanism and pipes, a hinge by which said structure is connected with the exterior pivot, and a joint whereby the suction-pipe is connected with the telescopic discharge-section, frame-timbers connecting with the telescopic section and slidable in guides fixed upon the anchored support of said section whereby the latter is supported during its extensions.

6. A pipe-line composed of essentially rigidly-united sections, a fixed support upon which the receiving end of the pipe is carried, a telescopic section slidable in and out of said pipe end, a socket formed in relation to the front end of said section, and a vertical spud-anchor passing therethrough and fixing the end of the telescopic section with relation to the pipe-line of which it forms a part, a structure hinged and turnable about said spud as a pivot, a discharge-pipe connecting with the suction-pump and excavating apparatus, a swivel-joint by which said pipe is connected with the end of the telescopic section of the main pipe, a bar extending from the clamp and a guide within which said bar is slidable whereby the structure, upon which are the suction and discharge pipes, is movable with relation to the pivot-spud.

7. In a dredging apparatus, a fixed longitudinally-extensible conveying-pipe, suction and discharge pipes with a swivel connection between the latter and the conveying-pipe, an opening formed in the lower front side of the suction-pipe, a downwardly-curved double-edged cutter-blade fixed beneath the opening, and pulley-blocks with ropes whereby the cutter, and suction and discharge pipes, are moved transversely from side to side about the swivel-joint.

8. The combination with the suction-pipe of a dredge having an opening in the lower side of the front end, of a cutter curved downwardly to form a loop with cutting edges upon both sides whereby material may be excavated and delivered into the suction-pipe by moving the latter transversely to either side.

9. The combination with the suction-pipe of a dredge having an opening in the lower side of the front end, of a cutting-blade curved downwardly to form a loop beneath the pipe-opening and having cutting edges upon each side, and plates projecting transversely upon each side of the rear of the cutter.

10. In a dredging apparatus, a conveying-pipe composed of essentially-fixed supported sections, an excavator, suction and forcing mechanism and pipes, an extensible telescopic pipe-section forming a connection between the suction and discharge pipes and the conveying-pipe, a joint connection whereby the excavating suction and discharge pipes are turnable about the stationary front of the telescopic section, and a supplemental joint in the main conveying-pipe whereby the direction may be changed exterior to said joint and the excavator and its connections moved bodily to a new point after a cut has been completed.

11. In a dredging apparatus, an excavator, suction and forcing pipes and mechanism, a fixed sectional conveying-pipe with a telescopic section slidable therein to advance the excavator with a turning joint between the discharge-pipe and said section to allow the excavator to swing from side to side, and connecting-joints between the main-conveying-pipe sections consisting of rigid guides between which the meeting ends of the pipes are abutted, inclosing sections surrounding the meeting ends of the pipes and clamps by which they are secured.

12. In a dredging apparatus, a fixed conveying-pipe, an excavator with suction and discharge pipes, a telescopic section slidable longitudinally in the conveying-pipe, a hinge-joint between the excavator and the telescopic section, and blocks and tackle or equivalent devices whereby the telescopic section is retained or moved with relation to the main conveying-pipe.

13. In a dredging apparatus, a fixed conveying-pipe, an excavator with suction and discharge pipes and an interposed suction and forcing mechanism, a telescopic pipe-section slidable longitudinally in the conveying-pipe and extensible with relation thereto, and a mechanism connecting the stationary and slidable sections whereby the latter may be released and allowed to advance by interior pressures produced by the forcing mechanism.

In witness whereof I have hereunto set my hand.

JOHN R. PARKER.

Witnesses:
E. H. RIX,
HENRY B. MADISON.